United States Patent
Hung et al.

(10) Patent No.: US 10,043,479 B2
(45) Date of Patent: Aug. 7, 2018

(54) IN-CELL TOUCH DISPLAY PANEL

(71) Applicant: MStar Semiconductor, Inc., Hsinchu Hsien (TW)

(72) Inventors: Guo-Kiang Hung, Hsinchu County (TW); Chi Kang Liu, Hsinchu County (TW); Ping-Yu Chan, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 385 days.

(21) Appl. No.: 14/841,793

(22) Filed: Sep. 1, 2015

(65) Prior Publication Data

US 2016/0070395 A1 Mar. 10, 2016

Related U.S. Application Data

(60) Provisional application No. 62/046,188, filed on Sep. 5, 2014.

(51) Int. Cl.
   *G09G 5/00* (2006.01)
   *G06F 3/041* (2006.01)
   *G09G 3/20* (2006.01)

(52) U.S. Cl.
   CPC .......... *G09G 5/003* (2013.01); *G06F 3/0412* (2013.01); *G09G 3/20* (2013.01); *G06F 2203/04108* (2013.01); *G09G 2300/0809* (2013.01)

(58) Field of Classification Search
   CPC .................................................. G09G 5/003
   USPC ....................................................... 345/174
   See application file for complete search history.

(56) References Cited

U.S. PATENT DOCUMENTS

| | | | | |
|---|---|---|---|---|
| 9,478,590 | B2* | 10/2016 | Lee | H01L 27/323 |
| 2013/0314371 | A1* | 11/2013 | Lee | G06F 3/0412 345/174 |
| 2013/0328812 | A1* | 12/2013 | Kim | G06F 3/044 345/173 |
| 2014/0071637 | A1* | 3/2014 | Hsu | H05K 1/0213 361/748 |
| 2014/0333582 | A1* | 11/2014 | Huo | G02F 1/13338 345/174 |

(Continued)

FOREIGN PATENT DOCUMENTS

| | | |
|---|---|---|
| CN | 103163676 A | 6/2013 |
| CN | 103279215 | 9/2013 |
| CN | 103793091 | 5/2014 |

*Primary Examiner* — Jason C Olson
(74) *Attorney, Agent, or Firm* — WPAT, PC

(57) ABSTRACT

An in-cell touch display panel includes a substrate, a semiconductor stack, a transparent layer, an insulating layer and a metal layer. The semiconductor stack is disposed on the substrate. The transparent layer is disposed on the semiconductor stack, and includes a plurality of connecting electrode strips extending along a first direction. The insulating layer is disposed on the transparent layer. The metal layer is disposed on the insulating layer, and includes a plurality of first touch electrode strips and a plurality of first touch electrode portions. The first touch electrode strips extend along a second direction. The first touch electrode portions and the connecting electrode strips form a plurality of second touch electrode strips extending along the first direction. The first touch electrode strips intersect and are insulated from the second touch electrode strips.

13 Claims, 12 Drawing Sheets

(56) References Cited

U.S. PATENT DOCUMENTS

2016/0188071 A1* 6/2016 Xu .................... G06F 3/044
  345/174
2016/0252785 A1* 9/2016 Kimura ............... G02F 1/13338
  349/12

* cited by examiner

IN-CELL TOUCH DISPLAY PANEL

This application claims the benefit of U.S. Provisional Application Ser. No. 62/046,188, filed Sep. 5, 2014, the subject matter of which is incorporated herein by reference.

BACKGROUND OF THE INVENTION

Field of the Invention

The invention relates in general to an in-cell touch display panel, and more particularly to a touch display panel that integrates a touch sensor in a display panel.

Description of the Related Art

A conventional touch display panel is formed by directly attaching a touch panel with a display panel, and thus has overall thickness and weight greater than those of one single display panel, resulting in a user portability burden. In some current solutions that integrate the touch control function into a display panel, the additional touch sensing circuits utilize transparent electrode blocks that do not connect to one another as driving electrodes and sensing electrodes. Indium tin oxide (ITO) is commonly adopted as a transparent electrode material, and has an unsatisfactory electric conductivity that not only affects the size of touch sensing signals but also limits the sensitivity of touch sensing elements.

SUMMARY OF THE INVENTION

It is a primary object of the present invention to provide an in-cell touch display panel. Without affecting the display function of a display panel, the in-cell touch display panel realizes the touch function and reduces the thickness and weight of the in-cell touch display panel at the same time. Further, with higher electric conductivity of a metal layer, the sensitivity of touch sensing elements are enhanced.

To achieve the above object, the present invention provides an in-cell touch display panel. The in-cell touch display panel includes a substrate, a semiconductor stack, a transparent layer, an insulating layer and a metal layer. The semiconductor stack is disposed on the substrate. The transparent layer is disposed on the semiconductor stack, and includes a plurality of connecting electrode strips extending along a first direction. The insulating layer is disposed on the transparent layer. The metal layer is disposed on the insulating layer, and includes a plurality of first touch electrode strips and a plurality of first touch electrode portions. The first touch electrode strips extend along a second direction. The first touch electrode portions and the connecting electrode strips form a plurality of second touch electrode strips extending along the first direction. The first touch electrode strips intersect and are insulated from the second touch electrode strips.

To achieve the above object, the present invention further provides another in-cell touch display panel having an active region and a border region. The in-cell touch display panel includes a substrate, a semiconductor stack and a metal layer. The semiconductor stack is disposed on the substrate. The metal layer is disposed on the semiconductor stack, and includes a plurality of first touch electrode portions and a plurality of conducting lines. The first touch electrode portions are disposed in the active region, the conducting lines are extended from the active region to the border region, and one end of each of the conducting lines is connected to one of the first touch electrode portions.

In the in-cell touch display panel of the present invention, a touch sensor may be disposed in the display panel without involving attaching an additional touch panel onto the display panel. Further, the touch sensing elements are primarily formed by the metal layer. By forming the first touch electrode strips and the first touch electrode portions through the metal layer, the impedance of the touch sensing elements can be lowered to enhance the sensitivity of the touch sensing elements.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
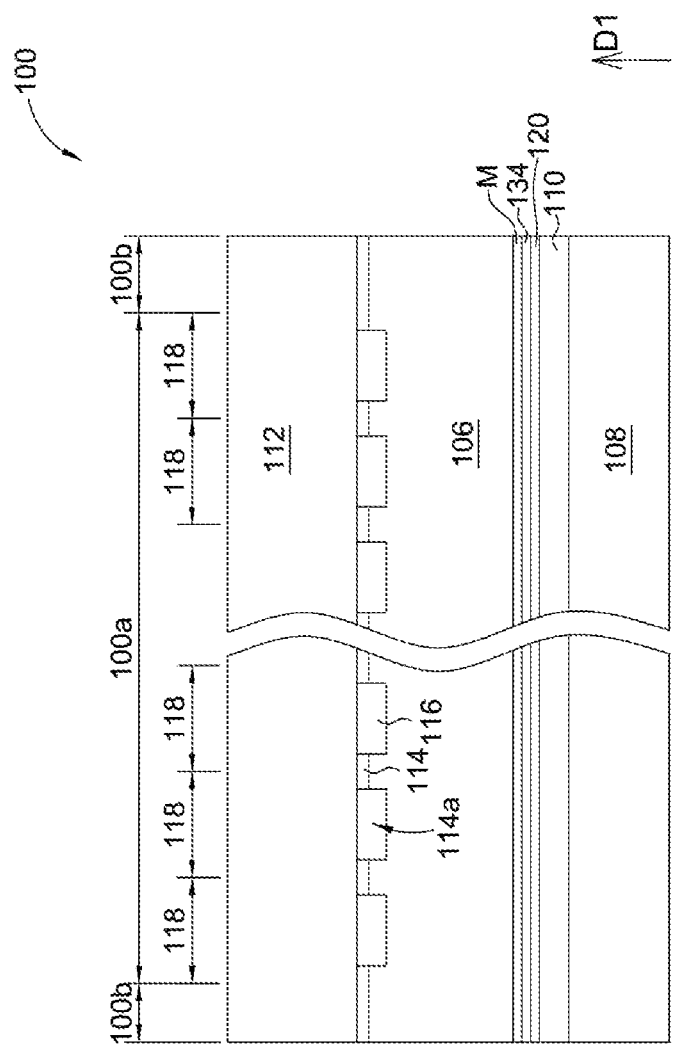
FIG. 1 is a section view of an in-cell touch display panel according to a first embodiment of the present invention.

Referring to FIG. 1, an in-cell touch display panel 100 according to an embodiment includes a first substrate 108, a second substrate 112 and a liquid crystal layer 106. The liquid crystal layer 106 is disposed between the first substrate 108 and the second substrate 112. In the embodiment, the first substrate 108 is provided with touch sensing elements for detecting a position of a touch object approaching or touching the in-cell touch display panel 100. As such, the touch sensing elements are integrated into the in-cell touch display panel 100 to provide the in-cell touch display panel 100 with a touch function. Further, the in-cell touch display panel 100 may include an active region 100a and a border region 100b. Elements for image display are allocated in the active region 100a. The border region 100b surrounds the active region 100a, and is for allocating circuits or control elements not to be seen by a user, such as peripheral circuits or driving elements, for example. In the embodiment, the active region 100a may be divided into a plurality of display pixel regions 118 for displaying pixels or sub-pixels, respectively. The in-cell touch display panel 100 may further include a semiconductor stack 110 formed on a surface of the first substrate 108 facing the liquid crystal layer 106. For example, the semiconductor stack 110 within each of the display pixel regions 118 may include a first metal layer, a gate insulating layer, a second metal layer, a first transparent layer and a first insulating layer sequentially stacked (not shown) on the first substrate 108. The first metal layer may include the gate of a thin-film transistor (TFT) and a gate line, the second metal layer may include the source and the drain of the TFT and a data line, the first transparent layer may include a pixel electrode electrically connected to the drain of the TFT, and the first insulating layer may cover the second metal layer, the pixel electrode and the gate insulating layer to protect the TFT. The TFT in the present invention is not limited to the above example, and may be other types, e.g., a low temperature poly-silicon (LTPS) transistor. Therefore, the semiconductor stack 110 of the present invention is not limited to the above structure, and may be correspondingly adjusted according to actual needs.

The in-cell touch display panel 100 of the embodiment may further include a black matrix 114 and a plurality of color filter plates 116. The black matrix 114 and the color filter plates 116 are disposed on a surface of the second substrate 112 facing the liquid crystal layer 106. The black matrix 114 includes a plurality of first openings 114a, and the color filter plates 116 are respectively provided on the second substrate 112 in the first openings 114a. The black matrix 114 is used to shield elements or wires not to be seen by a user, and only allows light to pass through areas where the amount of penetration and color of light are controllable. The in-cell touch display panel 100 is not limited to a liquid crystal panel (LCD), and may be other types of active array display panel, e.g., an organic light emitting display (OLED) panel.

Figure 2:
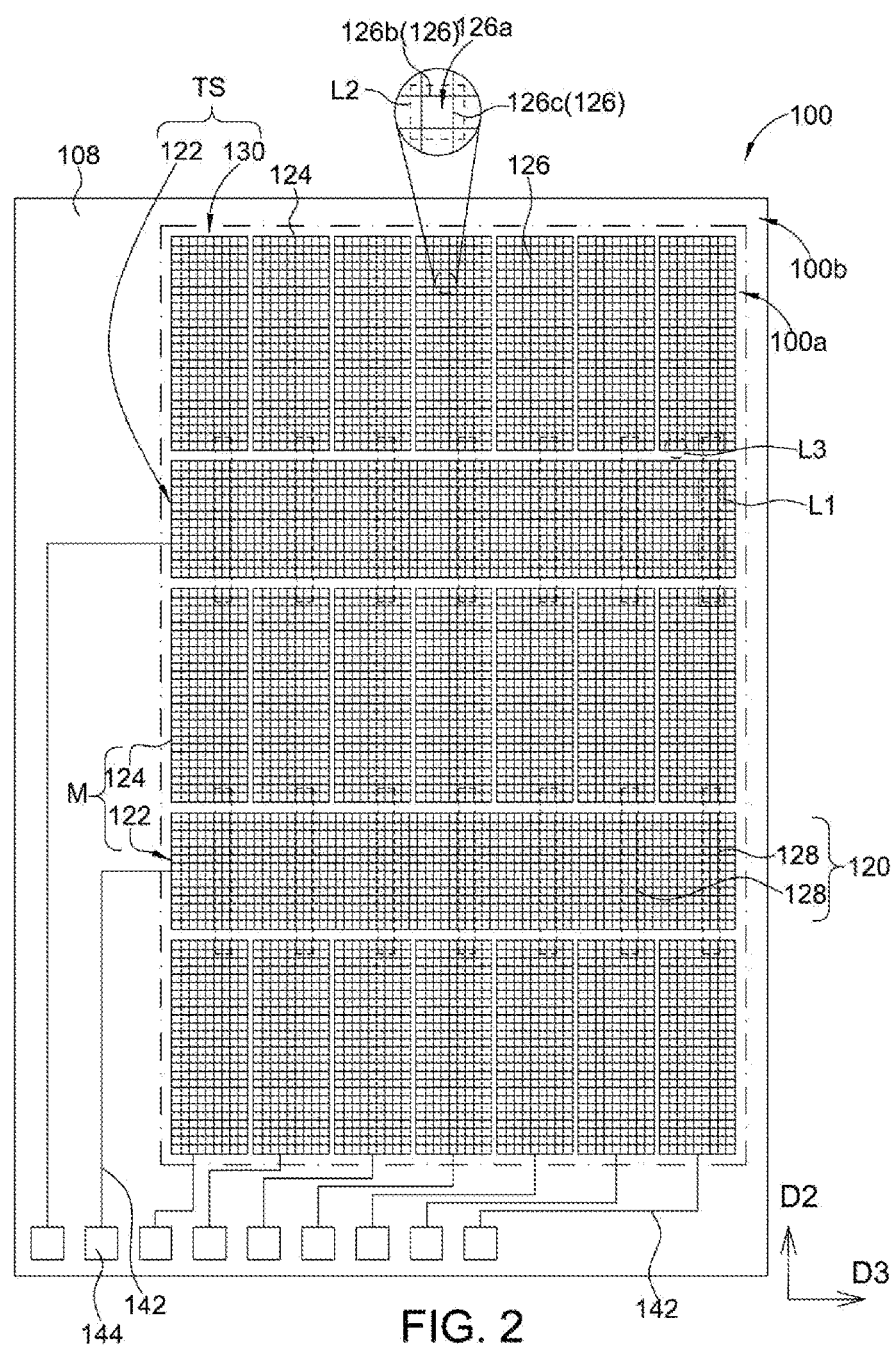
FIG. 2 is a top view of an in-cell touch display panel according to the first embodiment of the present invention.

Referring to FIG. 1 and FIG. 2, the in-cell touch display panel 100 of the embodiment further includes a second transparent layer 120 and a third metal layer M disposed on the first substrate 108. The third metal layer M includes a plurality of first touch electrode strips 122 and a plurality of first touch electrode portions 124 disposed in the active region 100a. Each of the first touch electrode strips 122 and the first touch electrode portions 124 is a lattice arrangement. More specifically, each of first touch electrode strips 122 and the first touch electrode portions 124 includes a plurality of grid lines that intersect one another, such that each of the first touch electrode strips 122 and the first touch electrode portions 124 includes a plurality of second openings 126a surrounded by the grid lines 126. For example, the grid lines 126 may be divided into first grid lines 126b extending along a first direction, e.g., the horizontal direction, and second grid lines 126c extending along a second direction, e.g., the vertical direction. Every two adjacent first grid lines 126b and every second grid lines 126c form one second opening 126a, such that the first grid lines 126b and the second grid lines 126c form a lattice pattern. The second openings 126a may be rectangular or be in other geometric shapes. For example, but not limited to, the first touch electrode portions 124 of the embodiment may be rectangular, or may be in other shapes.

The first touch electrode strips 122 and the first touch electrode portions 124 are not connected to and are electrically insulated from one another. The second transparent layer 120 includes a plurality of connecting strip groups 128, which extend along the second direction D2 and intersect the first touch electrode strips 122 extending along a third direction D3. Any two adjacent first touch electrode portions 124 arranged along the second direction D2 are electrically connected to one another through the connecting strip groups 128, such that the first touch electrode portions 124 and the connecting strip groups 128 form a plurality of second touch electrode strips 130 that intersect the first touch electrode strips 122. Thus, the first touch electrode strips 122 and the second touch electrode strips 130 may couple with one another to serve as touch sensing elements TS. For example, the first touch electrode strips 122 may transmit touch driving signals in an individually sequential or grouped sequential manner, i.e., the touch driving signals may be sequentially transmitted by a unit of one first touch electrode strip 122 or one group formed by multiple first touch electrode strips 122. At this point, due to the coupling with the first touch electrode strips 122, the one first touch electrode strip 122 or multiple first touch electrode strips 122 of the same group may sense the change in the touch driving signals to further transmit touch sensing signals. In other embodiment, the touch driving signals may also be transmitted by the second touch electrode strips 130, and the touch sensing signals may be received may be received by the first touch electrode strips 122.

In the embodiment, the first touch electrode portions 124 are in a matrix arrangement. The first touch electrode strips 122 extend along a row direction of the first touch electrode portions 124, i.e., the third direction D3, and are respectively located between every two adjacent first touch electrode portions 124. Further, the connecting strip groups 128 arranged along the third direction D3 cross a same first touch electrode strip 122. The first touch electrode portions 124 located at the same column are electrically connected to one another through the connecting strip groups 128 to form the second touch electrode strips 130. It should be noted that, the relationship between the first touch electrode strips 122 and the first touch electrode portions 124 of the present invention is not limited to the above example. In other embodiment, the first touch electrode strips 122 may also extend along a column direction of the first touch electrode portions 124, i.e., the second direction D2, and are respectively located between every two adjacent columns of first touch electrode portions 124. Further, the first touch electrode portions 124 located at the same row are electrically connected to one another through the connecting strip groups 128.

Figure 3:
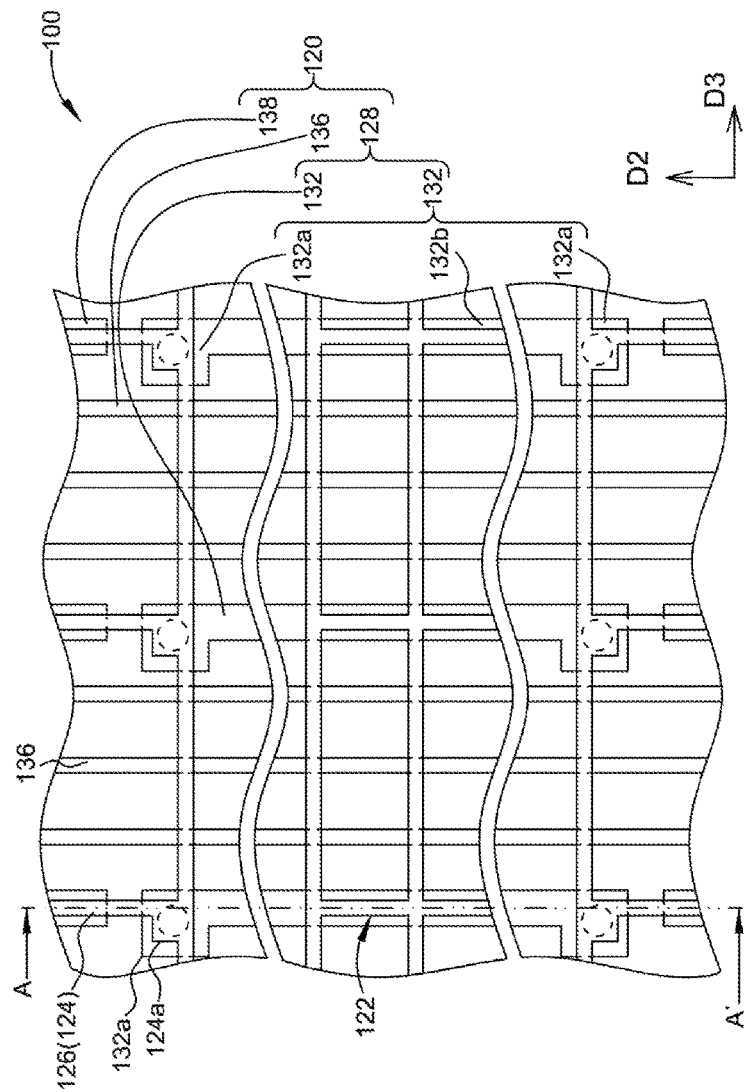
FIG. 3 is an enlarged view of an area L1 in FIG. 2.

Referring to FIG. 3, each of the connecting strip groups 128 may include at least one connecting electrode strip 132 extending along the second direction D2. In the embodiment, each of the connecting strip groups 128 includes a plurality of connecting electrode strips 132, and the connecting electrode strips 132 of each connecting strip groups 128 are electrically connected to the grid lines 126 of every two adjacent first touch electrode portions 124 disposed along the second direction D2, so as to further electrically connect the first touch electrode portions 124 of the same column to one another. In the embodiment, each of the first touch electrode portions 124 may include a plurality of first connecting portions 124a. The first connecting portions 124a extend out from one side of the grid lines 126, and have a width greater than that of the grid lines 126. Each of the connecting electrode strips 132 may include at least two second connecting portions 132a and at least one segment portion 132b. The second connecting portions 132a are located at two ends of the segment portions 132b, extend out from one side of the segment portions 132b, and have a width greater than that of the segment portions 132b.

Figure 4:
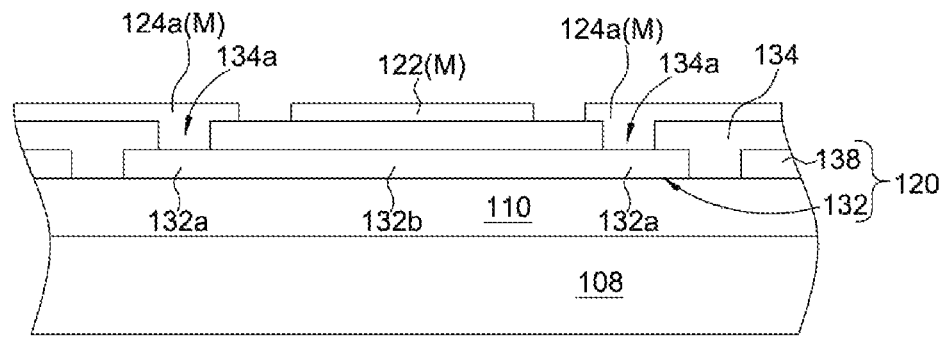
FIG. 4 is a section view of FIG. 3 along a section line A-A'.
Figure 5:
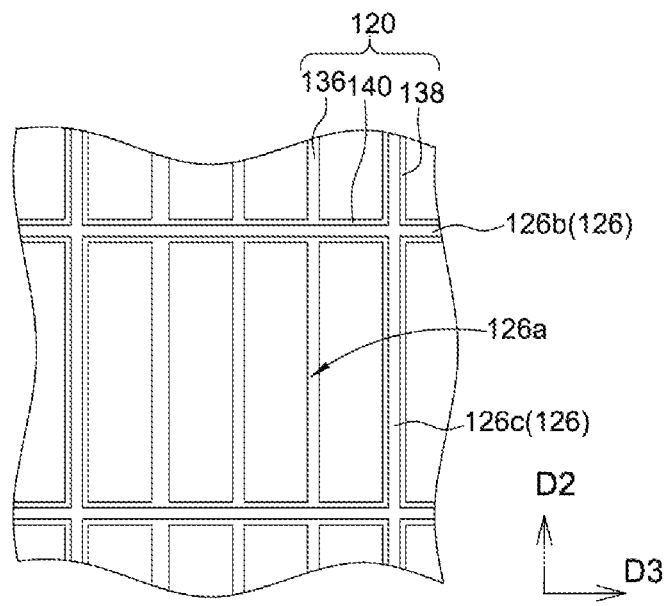
FIG. 5 is an enlarged view of an area L2 in FIG. 2.

Referring to FIG. 3 to FIG. 5, the second transparent layer 120 is disposed on the surface of the first substrate 108 facing the liquid crystal layer 106, and the third metal layer M is disposed on the second transparent layer 120. The in-cell touch display panel 100 of the embodiment may further include a second insulating layer 134. The second insulating layer 134 is disposed on the first substrate 108, and is between the second transparent layer 120 and the third metal layer M. Further, the second insulating layer 134 includes a plurality of first vias 134a, through which the first connecting portions 124a may be electrically connected to the second connecting portions 132a. It should be noted that, due to manufacturing process limitations, the first vias 134a cannot be made to have a width smaller than that of the grid lines 126. Thus, the width of the first connecting portions 124a needs to be greater than that of the grid lines 126, and the width of the second connecting portions 132a needs to be greater than that of the segment portions 132b of the connecting electrode portions 132. The first vias 134 are disposed correspondingly to overlapping parts of the first connecting portions 124a and the second connecting portions 132a, so that the grid lines 126 may effectively electrically connect to one of the corresponding connecting electrode strips 132.

In the embodiment, the second transparent layer 120 may further include a plurality of first common electrode strips 136 parallel to the connecting strips 132. At least two of the first common electrode strips 136 are disposed between two adjacent connecting strips 132 arranged along the third direction D3. The first common electrode strips 136 are applied a common voltage during an image display process, and are electrically insulated from the connecting electrode strips 132 and the third metal layer M.

The second transparent layer 120 may further include a plurality of second common electrode strips 138 and a plurality of first connecting segments 140. The second common electrode strips 138 are respectively disposed between two adjacent connecting electrode strips 132 arranged along the second direction D2, and are electrically insulated from the connecting electrode strips 132. In the embodiment, the second common electrode strips 138 may be electrically connected to the first common electrode strips 136 through the first connecting segments 140 extending along the third direction D3, and the first connecting segments 140 may be connected to respective adjacent first common electrode strips 136, such that the second common electrode strips 138 also have the common voltage during an image display process. When the in-cell touch display panel 100 performs the image display function, a voltage difference between the pixel electrodes and the first common electrode strips 136 as well as the second common electrode strips 138 may form a transverse electric field. In other embodiments, the second transparent layer 120 may not exclude the first connecting segments 140. In yet other embodiments, the connecting electrode strips 132 of the connecting strip groups 128 may cross all of the first touch electrode strips 122, so that the first touch electrode portions 124 of the same column may be electrically connected to one another through the same connecting strip group 128.

Referring to FIG. 2, the in-cell touch display panel 100 of the embodiment may further include a plurality of first connecting lines 142 and a plurality of connecting pads 144. The first connecting lines 142 respectively electrically connect the first touch electrode strips 122 and the second touch electrode strips 130 to the connecting pads 144, thereby transmitting the touch driving signals to the first touch electrode strips 122 and/or the second touch electrode strips 130 through the connecting pads 144, and receiving the touch sensing signals that the first touch electrode strips 122 and/or the second touch electrode strips 130 sense from the first touch electrode strips 122 and/or the second touch electrode strips 130 through the connecting pads 144. In the embodiment, the first connecting lines 142 and the connecting pads 144 may be formed by the third metal layer M, for example. In other embodiments, the first connecting lines 142 and the connecting pads 144 may be formed by a conductive layer different from the third metal layer M, e.g., any conductive layer in the semiconductor stack 110. Further, the first connecting lines 142 and the connecting pads 144 may be formed by the same conductive layer or different conductive layers.

Figure 6:
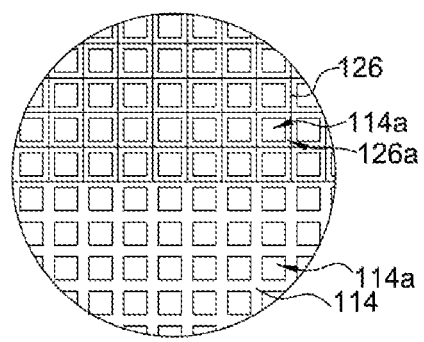
FIG. 6 is an enlarged view of an area L3 in FIG. 2.

Referring to FIG. 6 as well as FIG. 2, it should be noted that, the grid lines 126 of the third metal layer M are disposed along an extension direction of the black matrix 144, such that the black matrix 114 can shield the third metal layer M in the first direction D1 to prevent the third metal layer M from being seen by a user. In the embodiment, the second openings 126a are respectively disposed correspondingly to a part of the first openings 114a. For example, the second openings 126a may be disposed correspondingly to this part of the first openings 114a, and are equal to or larger than the first openings 114a to allow the black matrix 114 to shield all of the grid lines 126. The second openings 126a of the present invention are not limited to being disposed correspondingly to one single first opening 114a. In other embodiments, the second openings may each correspond to at least two first openings 114, i.e., the second openings 126a may be larger than at least two first openings 114a.

Figure 7:
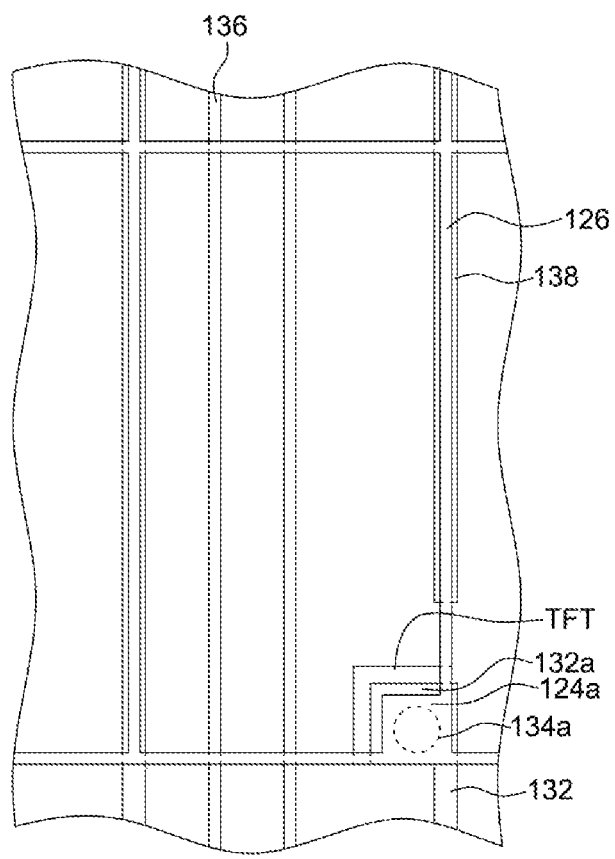
FIG. 7 is a top view of first connecting portions, second connecting portions, first vias, and a TFT according to the first embodiment of the present invention.

Referring to FIG. 7, as the width of the black matrix 114 shielding the think-film transistor TFT is greater than the width of the black matrix shielding the grid lines 126, the second connecting portions 132a and the first vias 134a are preferably disposed correspondingly to the thin-film transistor TFT, such that the black matrix 114 may shield the second connecting portions 132a and the first vias 134a. In the embodiment, the first connecting portions 124a, the second connecting portions 132a and the first vias 134a are disposed on the thin-film transistor TFT.

It is known from the above description that, the touch sensing elements TS may be disposed on the first substrate 108, and hence an additional touch panel that attaches onto the in-cell touch display panel is not required. In the embodiment, the touch sensing elements TS are formed by the third metal layer M and the connecting strips 132 of the second transparent layer 120. By forming the first touch electrode strips 122 and the first touch electrode portions 124 through the third metal layer M, the impedance of the touch sensing elements TS may be reduced to enhance the sensitivity of the touch sensing elements TS. Further, the third metal layer M of the embodiment may be disposed along an extension direction of the black matrix 114 and may then be shielded by the black matrix 144, in a way that an image displayed can be normally displayed instead of being blocked by the third metal layer M.

The in-cell touch display panel of the present invention is not limited to the embodiment above. Other embodiments are further disclosed below. To keep the description simple and to emphasize differences between the embodiments and variations, the same components are represented by the same denotations, and the repeated parts are omitted herein.

Figure 8:
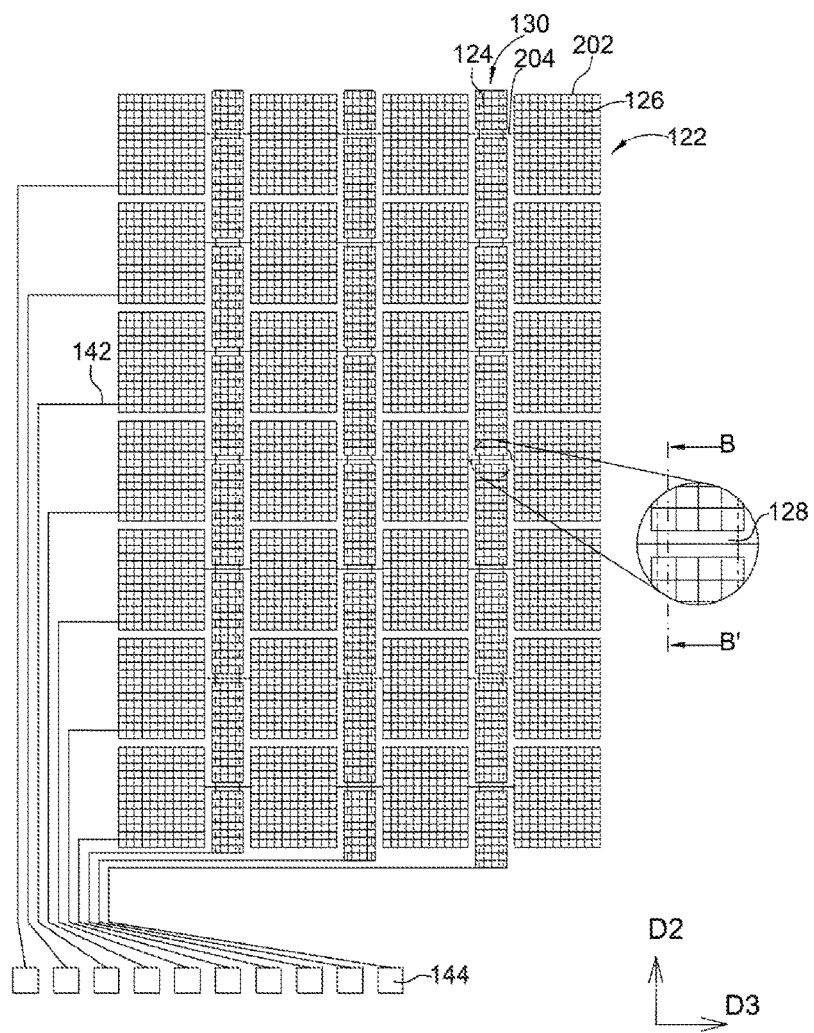
FIG. 8 is a top view of an in-cell touch display panel according to a second embodiment of the present invention.
Figure 9:
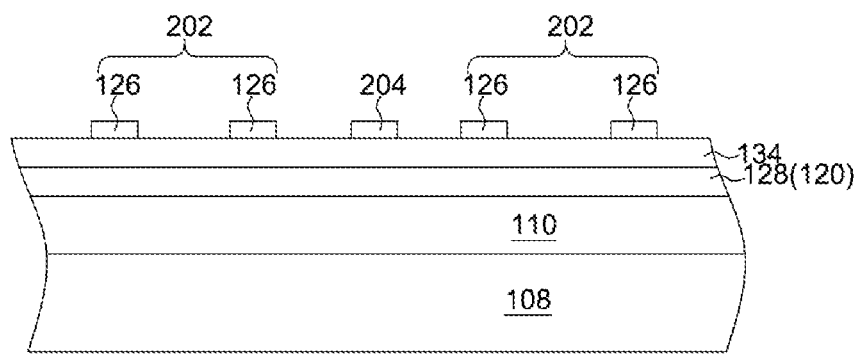
FIG. 9 is a section view of FIG. 8 along a section line B-B'.

Referring to FIG. 8 and FIG. 9 showing a second embodiment of the present invention, the configuration of the first touch electrode strips 122 and the first touch electrode portions 124 of the second embodiment is different from that of the first embodiment. Compared to the first embodiment, the first touch electrode strips 122 of this embodiment may include a plurality of second touch electrode portions 202 in a matrix arrangement and a plurality of second connecting segments 204, and the second touch electrode strips 130 are located between every two adjacent columns of second touch electrode portions 202. More specifically, the second touch electrode portions 202 and the second connecting segments 204 of the first touch electrode strips 122 are alternately arranged along the third direction D3, such that the second connecting segments 204 are respectively connected between every two adjacent second touch electrode portions 202 arranged along the third direction D3 and cross the connecting strip groups 128. In the embodiment, the second touch electrode portions 202 are formed by the intersecting grid lines 126, and the second connecting segments 204 are formed by one single grid line 126 and have a width equal to that of the grid lines 126. In the present invention, each of the second connecting segments 204 connecting two adjacent second touch electrode portions 202 is not limited to one single connecting segment, and may be formed by connecting multiple second connecting segments 204 and is not limited to one single grid line. The connecting strip groups 128 of the embodiment may cross all of the first touch electrode strips 122, and the second transparent layer 120 does not include the second common electrode strips. Thus, for example, but not limited to, the first touch electrode portions 124 of the same row may be electrically connected to one another through the same connecting strip group 128.

Figure 10:
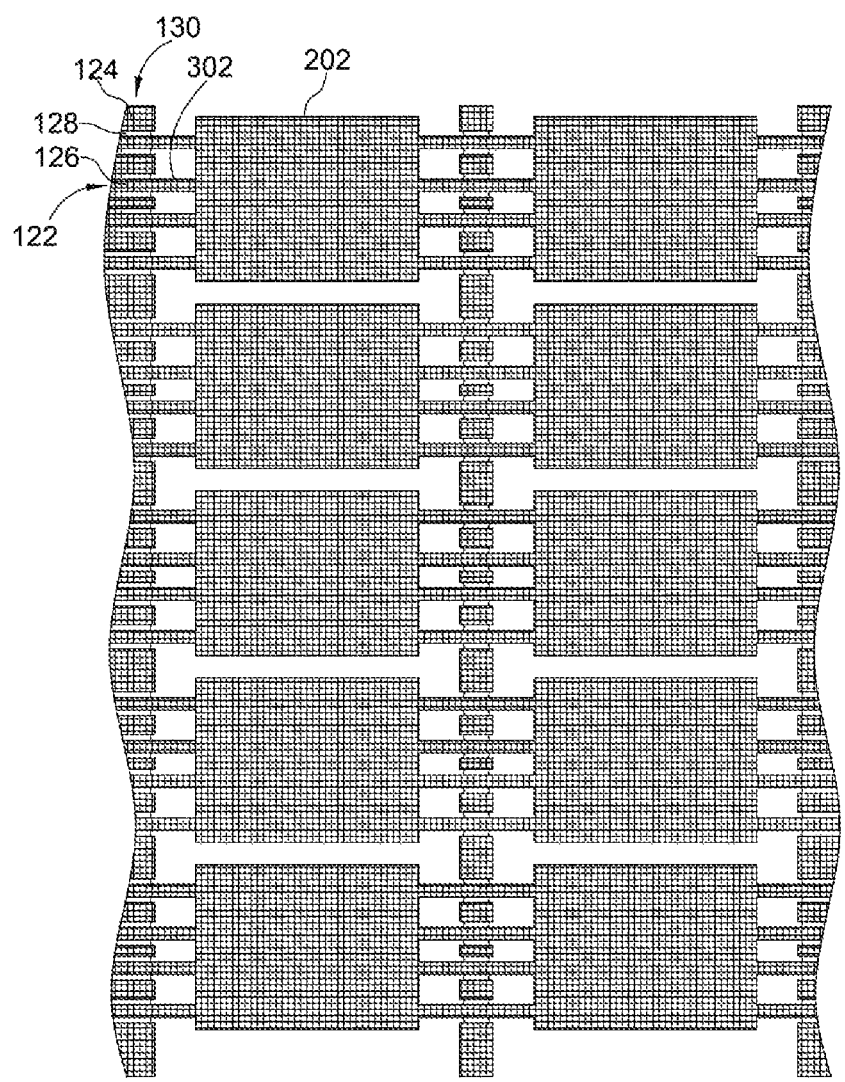
FIG. 10 is a top view of an in-cell touch display panel according to a third embodiment of the present invention.

Refer to FIG. 10 corresponding to a third embodiment of the present invention. Compared to the second embodiment, every two adjacent second touch electrode portions 202 in this embodiment are electrically connected through a plurality of second connecting segments 302. The second connecting segments 302 are formed by a plurality of grid lines 126 in a lattice arrangement, and have a width greater than that of the grid lines 126.

Figure 11:
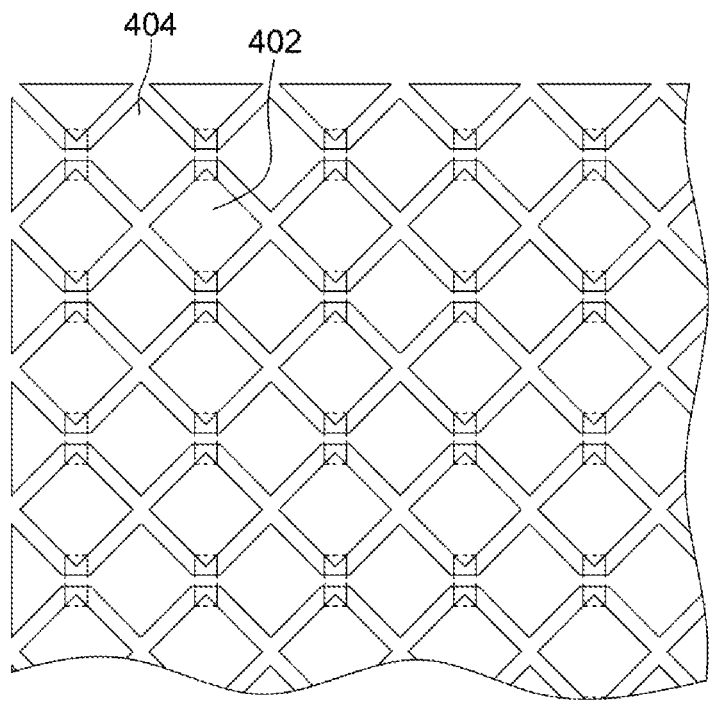
FIG. 11 is a top view of an in-cell touch display panel according to a fourth embodiment of the present invention.
Figure 12:
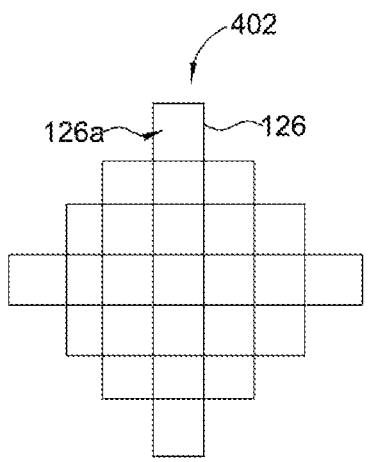
FIG. 12 is an enlarged view of first touch electrode portions or second touch electrode portions in FIG. 11.

Refer to FIG. 11 and FIG. 12 corresponding to a fourth embodiment of the present invention. Compared to the second embodiment, each of the first touch electrode portions 402 in this embodiment may be in a rhombus arrangement, as shown in FIG. 12. Similarly, each of the second touch electrode portions 404 may be a rhombus arrangement. Further, the quantity of second openings 126a formed by the surrounding grid lines 126 may be determined according to the sizes of the first touch electrode portions 402 and the second touch electrode portions 404, and may be at least 5 to construct a cross shape.

Figure 13:
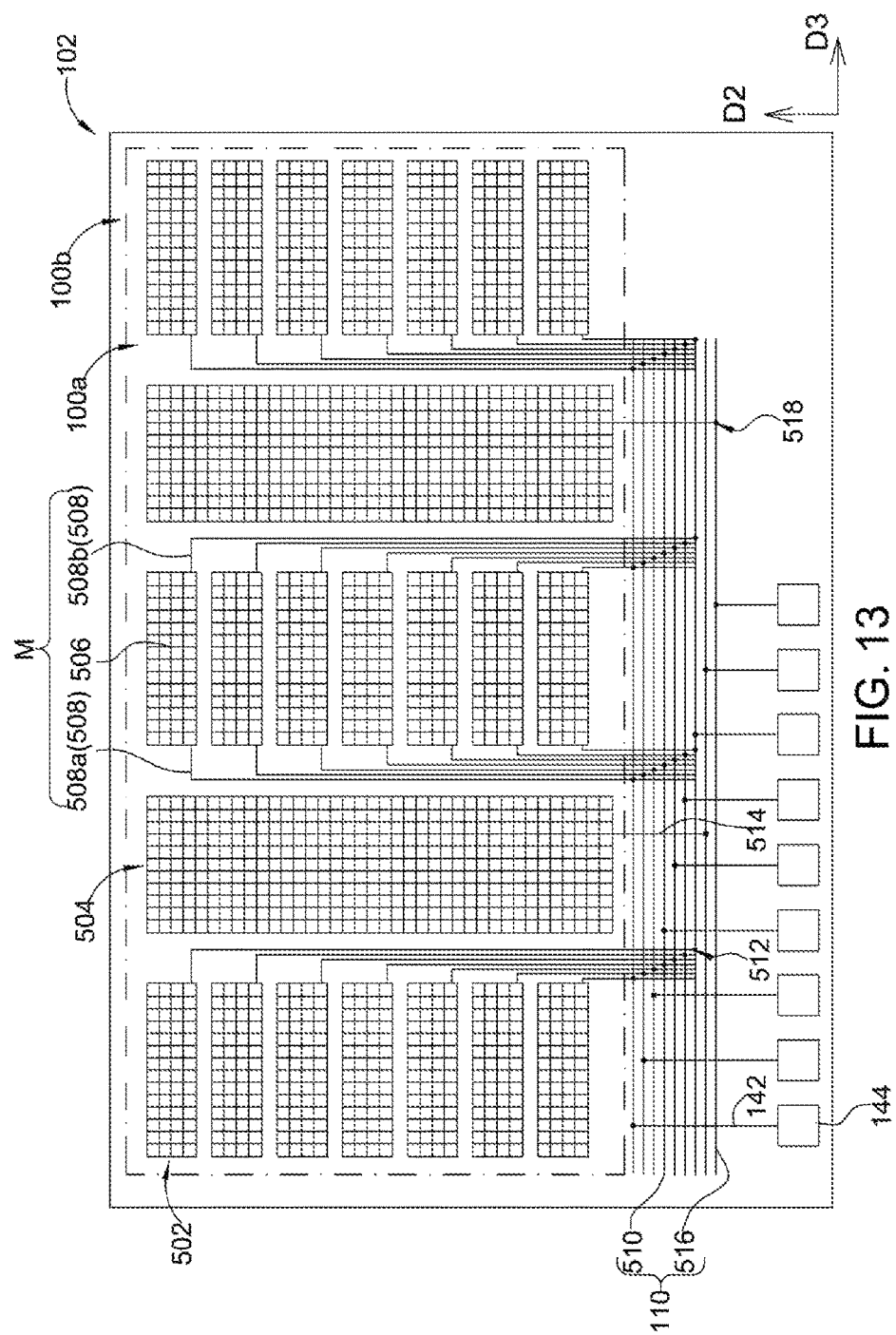
FIG. 13 is a top view of an in-cell touch display panel according to a fifth embodiment of the present invention.

Refer to FIG. 13 corresponding to a fifth embodiment of the present invention. Compared to the first embodiment, second touch electrode strips 502 in this embodiment do not intersect first touch electrode strips 504 in the active region 100a. The first touch electrode strips 504 extend along the second direction D2, and are arranged along the third direction D3. The third metal layer M may further include a plurality of first conducting lines 508 extending from the active region 100a to the border region 100b. One end of each of the connecting lines 508 is connected to at least one side of each of the first touch electrode portions 506. In the embodiment, the first conducting lines 508 may be divided into first side conducting lines 508a and second side conducting lines 508b. The first side conducting lines 508a are connected to one side of the first touch electrode portions 506, and the second side conducting lines 508b are connected to one other side of the first touch electrode portions 506. The semiconductor stack 110 may further include a plurality of second connecting lines 510 disposed in the border region 100b. One end of the first side conducting lines 508a and one end of the second side conducting lines 508b are electrically connected to the second connecting lines 510, such that the first touch electrode portions 506 located at different rows may be electrically connected to one another through the first side conducting lines 508a, the second side conducting lines 508b and the second connecting lines 510 to form the second touch electrode strips 502. For example, the second connecting lines 510 extend along the third direction D3, and the first side conducting lines 508a and the second side conducting lines 508b extend along the second direction D2 to the border region 110b to be electrically connected the second connecting lines 510. The first side conducting lines 508a and the second side conducting lines 508b cross some of the second connecting lines 510, and are electrically connected to the corresponding second connecting lines 510 through second vias 512. The third metal layer M may further include a plurality of second conducting lines 514 respectively connected to one side of the first touch electrode strips 504. The semiconductor stack 110 may further include a plurality of third connecting lines 516 disposed parallel to the second connecting lines 510. The second conducting lines 514 cross the second connecting lines 510 to electrically connect the first touch electrode strips 504 to the third connecting lines 516. Further, the second conducting lines 514 cross the second connecting lines 510 to electrically connect the first touch electrode strips 504 to the third connecting lines 516. Further, the first connecting lines 142 may be electrically connected to the second connecting lines 510 and the third connecting lines 516 through third vias 518, respectively, to electrically the first touch electrode strips 504 and the second touch electrode strips 502 to the connecting pads 144. The second connecting lines 510 and the third connecting lines 516 may be formed by the first metal layer forming the gate lines or the second metal layer forming the data lines. Alternatively, a part of the second connecting lines 510 and the third connecting lines 516 may be formed by the first metal layer, and the other part may be formed by the second metal layer. In other embodiments, the third metal layer M may exclude the second conducting lines 514, and the first touch electrode strips 504 may be electrically connected to the pads 144 directly through the corresponding first connecting lines 142, respectively.

Figure 14:
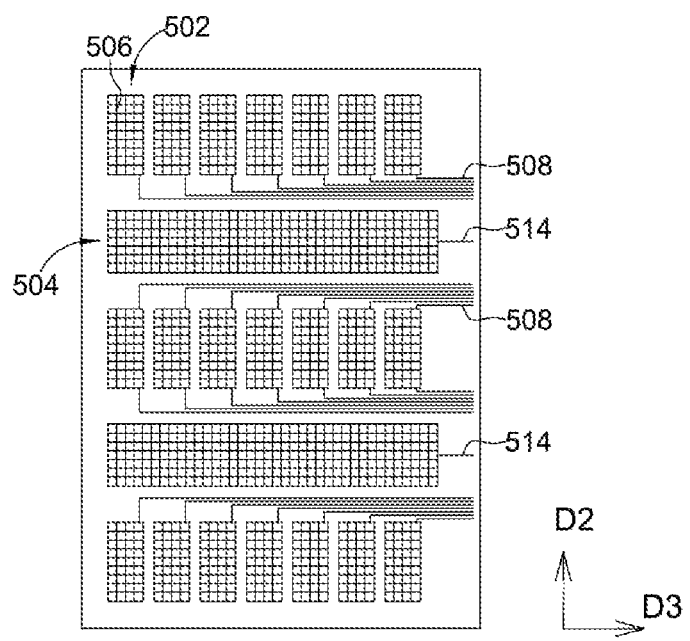
FIG. 14 is a top view of an in-cell touch display panel according to a sixth embodiment of the present invention.

Refer to FIG. 14 corresponding to a sixth embodiment of the present invention. Compared to the fifth embodiment, the second direction D2 and the third direction D3 in this embodiment are exchanged. Thus, the first touch electrode strips 504 extend along the third direction D3, and the first touch electrode portions 506 located at the same column and arranged along the second direction D2 are electrically connected to one another to form the second touch electrode strips 502. Configuration details of the first connecting lines 142, the second connecting lines 510, the third connecting lines 516, the first conducting lines 508 and the second conducting lines 514 are identical to those of the fifth embodiment, and shall be omitted herein.

In conclusion, the touch sensing elements of the present invention may be disposed on the first substrate of the in-cell touch display panel, and hence an additional touch panel that is attached onto the in-cell touch display panel is not required. Further, the touch sensing elements are formed by the connecting electrode strips at the third metal layer and the second transparent layer, and the impedance of the touch sensing elements can be reduced through the first touch electrode strips and the first touch electrode portions formed by the third metal layer, thereby enhancing the sensitivity of the touch sensing elements. Further, the third metal layer may be disposed along the extension direction of the black matrix of the second substrate and may be shielded by the black matrix. Thus, an image displayed can be normally displayed instead of being blocked by the third metal layer.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An in-cell touch display panel, comprising:
   a substrate;
   a semiconductor stack, disposed on the substrate;
   a transparent layer, disposed on the semiconductor stack, comprising a plurality of connecting electrode strips extending along a first direction, a plurality of common electrode strips disposed parallel to the connecting electrode strips, at least two of the common electrode strips are arranged between two adjacent connecting strips of the connecting electrode strips arranged along the second direction;
   an insulating layer, disposed on the transparent layer; and
   a metal layer, disposed on the insulating layer, comprising a plurality of first touch electrode strips and a plurality of touch electrode portions, the first touch electrode strips extending along a second direction, the first touch electrode portions and the connecting electrode strips forming a plurality of second touch electrode strips extending along the first direction, the first touch electrode strips intersecting and insulated from the second touch electrode strips, wherein the metal layer is electrically insulated from the common electrode strips.

2. The in-cell touch display panel according to claim 1, wherein every two adjacent first touch electrode portions arranged along the first direction are connected to each other through one of the connecting electrode strips.

3. The in-cell touch display panel according to claim 1, wherein the first touch electrode strips and the first touch electrode portions are in a lattice arrangement.

4. The in-cell touch display panel according to claim 3, further comprising:
   a black matrix, comprising a plurality of first openings;
   wherein, the first touch electrode strips and the first touch electrode portions comprise a plurality of second openings, respectively; the second openings are disposed correspondingly to the first openings, and are equal to or larger than the first openings.

5. The in-cell touch display panel according to claim 4, wherein the black matrix shields the connecting electrode strips in a third direction perpendicular to the substrate.

6. The in-cell touch display panel according to claim 1, wherein the first touch electrode portions are in a matrix arrangement, and the first touch electrode strips are located between every two adjacent rows of the first touch electrode portions, respectively.

7. The in-cell touch display panel according to claim 1, wherein the first touch electrode strips comprise a plurality of second touch electrode portions and a plurality of connecting segments, and one of the connecting segments electrically connects two adjacent second touch portions of the second touch portions and crosses one of the connecting electrode strips.

8. The in-cell touch display panel according to claim 7, wherein the first touch electrode portions and the second touch electrode portions comprise a plurality of intersecting grid lines, and a width of the connecting segments is equal to a width of the grid lines.

9. The in-cell touch display panel according to claim 7, wherein the second touch electrode portions are in a matrix arrangement, and the second touch electrode strips are located between every two adjacent lines of the second touch electrode portions, respectively.

10. The in-cell touch display panel according to claim 7, wherein the first touch electrode portions and the second touch electrode portions are in a rhombus arrangement.

11. The in-cell touch display panel according to claim 1, wherein the first touch electrode portions comprise a plurality of intersecting grid lines and a plurality of connecting portions, the connecting portions extend out from one side of the grid lines, and a width of the connecting portions is larger than a width of the grid lines.

12. The in-cell touch display panel according to claim 11, wherein the insulating layer comprises a plurality of vias, and each of the connecting portions is electrically connected to one of the connecting portions through the vias.

13. The in-cell touch display panel according to claim 12, wherein the semiconductor stack comprises a plurality of thin-film transistors (TFTs), and the vias and the connecting portions are disposed on the TFTs.

* * * * *